Dec. 11, 1951   W. D. OSBORN   2,578,584
MULTIPLE SPEED POWER TRANSMITTING
MEANS FOR SEWER ROD TRACTORS
Filed Aug. 1, 1947   3 Sheets-Sheet 1
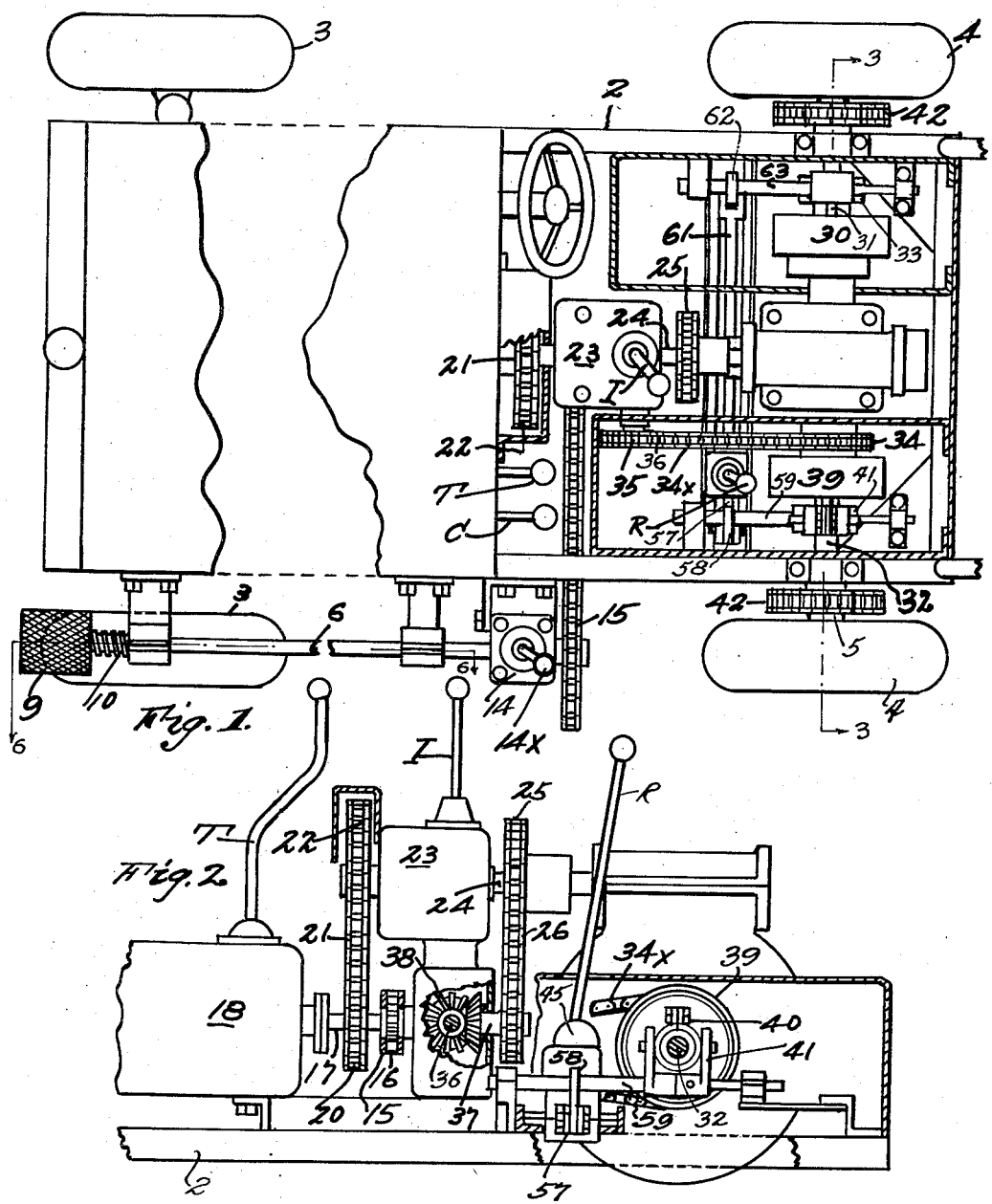
William D. Osborn,
INVENTOR;
By his attorney,
Frederick E. Maynard.

Dec. 11, 1951     W. D. OSBORN     2,578,584
MULTIPLE SPEED POWER TRANSMITTING
MEANS FOR SEWER ROD TRACTORS
Filed Aug. 1, 1947                                   3 Sheets-Sheet 2
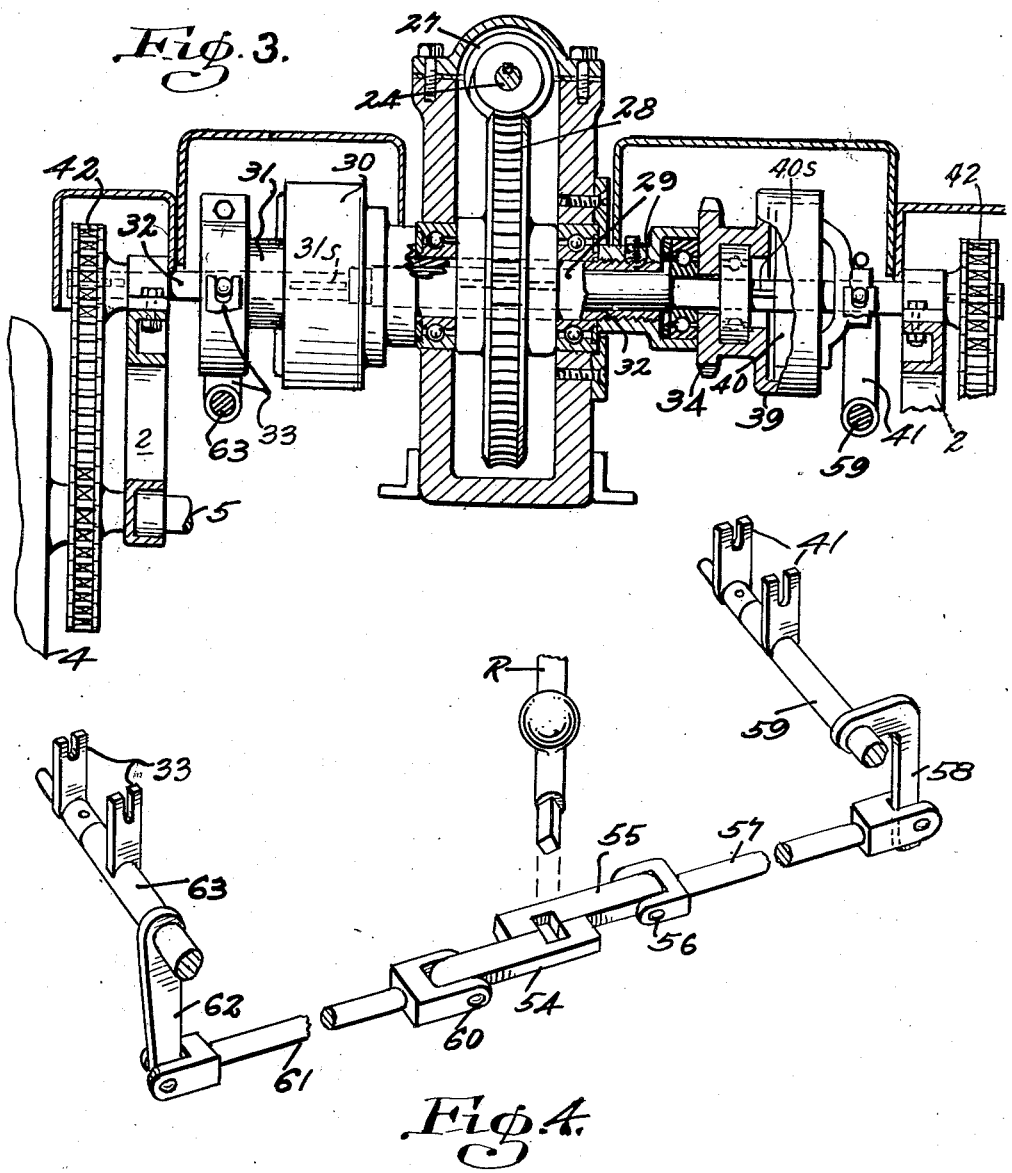
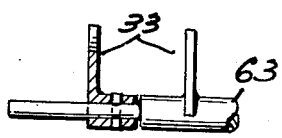
INVENTOR.
*William D. Osborn*
BY
*Frederick E. Maynard,*
ATTORNEY.

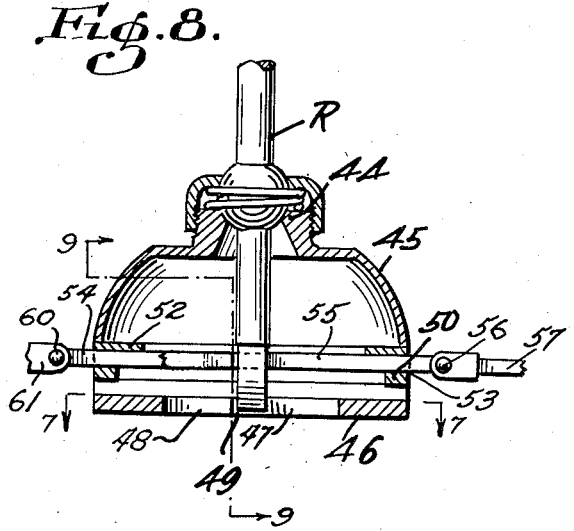
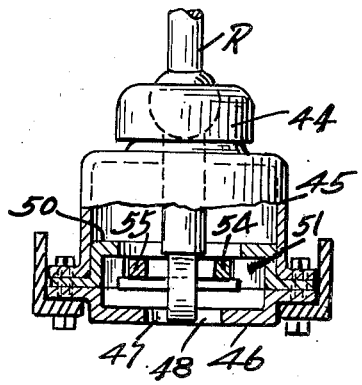
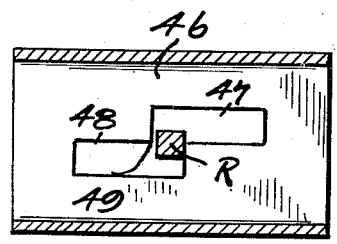
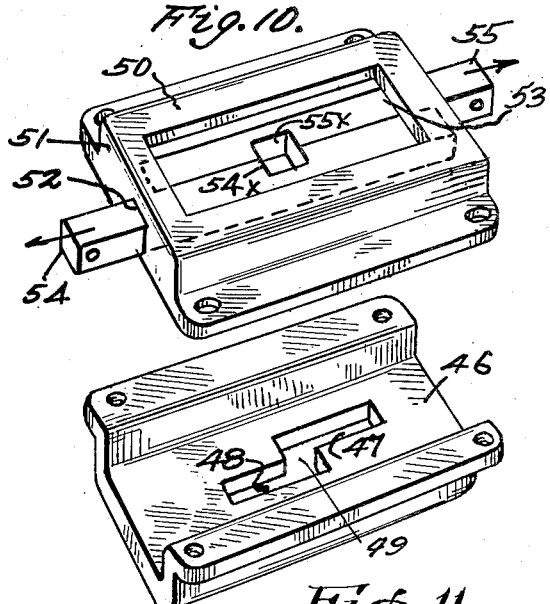
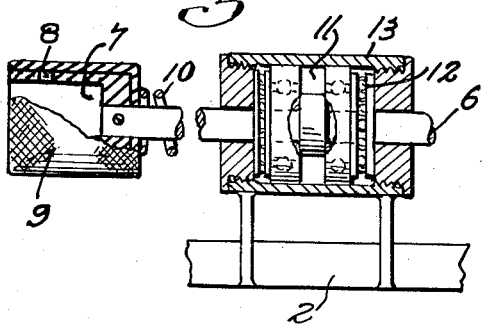

Patented Dec. 11, 1951

2,578,584

UNITED STATES PATENT OFFICE 2,578,584

MULTIPLE SPEED POWER TRANSMITTING MEANS FOR SEWER ROD TRACTORS

William D. Osborn, Los Angeles, Calif.

Application August 1, 1947, Serial No. 765,494

2 Claims. (Cl. 180—70)

This invention is a sewer rod, tool working tractor of the general power-plant type shown in Pat. No. 2,225,129 in which there is a traction wheel axle driven by a cross-shaft having several, independent chain transmissions to the axle, and driven directly from the variable speed transmission of the vehicle.

The present invention has for an object to greatly increase the possible speed changes of the driven axle as to the motor of the tractor whereby to enable relatively fast road travel and its efficient use in yard or field operations when not operating a tool driving rod.

Particularly, it is an object of the invention to provide a compact, small, powerful tractor incorporating a sewer-rod drive shaft and which includes transmission mechanisms enabling the very slow advance of the tractor whilst a coupled rod is being slowly advanced to and rotated in bore accumulations or accretions. In this connection an object is to provide a drive means which will effectively hold pressure on the rod driving a work tool as it may set up a substantial back resistance on the travelling tractor; the driving means being so powerful as to prevent the tractor from being pushed backward under work resistance.

The invention resides in certain advancements in this art as set forth in the ensuing disclosure and having, with the above, additional objects and advantages as will be made manifest in the following description of the tractor and its manner of operation; it being understood that modifications, variations and adaptations may be resorted to within the scope, spirit and principles of the invention as it is claimed in conclusion hereof.

Figure 1 is a sectional, partial plan of the tractor.

Figure 2 is a sectional, partial elevation of the tractor.

Figure 3 is a vertical, transverse, axial section of the rear end drive mechanism of the tractor, on line 3—3, Fig. 1.

Figure 4 is a perspective of the detached rear-end, speed control lever train.

Figure 5 is a detail section of a yoke device of the lever train.

Figure 6 is a sectional detail of the rod driving shaft on line 6—6, Fig. 1.

Figure 7 is a sectional plan of the bottom or switch plate of the manual, rear-end control lever on line 7—7, Fig. 8.

Figure 8 is a vertical section of the rear-end, control lever housing, along the axis of a shift link device, Figure 9 is a section on line 9—9, Fig. 8.

Figure 10 is a perspective of the bearing frame of the shift link device, and

Figure 11 is a perspective of the lower or switch plate.

The tractor embodies a suitable chassis frame 2 having front steering wheels 3 of conventional type, and rear or drive wheels 4 each rigidly fixed on a full floating, rear axle 5. While the tractor can be employed for general utility purposes when so desired it has the principal object of both positively driving a flexible rod, not shown, by which bore cleaning, rotary tools can be rotated, in either direction, or pushed into or pulled from a bore being cleaned.

For such rod driving function there is journalled externally of the frame 2 a substantial shaft 6 having on its forward end a fixed socket 7, with a pin hole 8, adapted to receive a complementary, cylindrical, rod coupling, of a type well known in the art. Slidably mounted on the socket 7 is a sleeve 9 to cover a pin, not shown, which may be inserted in the socket after such a coupling has been positioned in the socket. A spring 10 normally thrusts the sleeve 9 to its pin hole covering position, Fig. 6.

The rear end of the rod shaft 6 has a fixed, cross shoulder 11 running on end-thrust bearings 12, in a bearing box 13. The shaft 6 is provided with its own variable speed transmission gear 14, Fig. 1, driven by a sprocket chain drive 15, or its equivalent, including a pinion 16 directly fixed on a rearwardly extending shaft 17 from a primary motor, power plant including a master transmission gear unit 18, whose several forward and reverse speeds are controlled by the transmission lever T, arranged close to which is a motor-clutch lever C. It will be seen that the transmissions 14 and 18 combine to give a large speed range to the rod driving shaft 6, both forward and reverse. Lever 14x controls gear transmission 14.

It is highly desirable that the tractor can be advanced or reversed at reasonably fast or very slow speed either with or without rotation of the rod driving shaft 6 during the time that a tool rod is coupled thereto at the socket mentioned. To accomplish such a range of speeds there is fixed to the shaft 17 a sprocket pinion 20 driving a chain 21 to a larger sprocket 22 of an intermediate transmission gear 23 having a manual lever I by which speed of a take-off shaft 24 is controlled. The take-off shaft drives a sprocket 25 of a sprocket chain 26 for a purpose later described.

Fixed on the shaft 24 is a gear-worm 27, Fig. 3, constantly meshing with a large worm-gear wheel 28. This wheel is fixed on a hollow shaft or sleeve 29 suitably mounted on the chassis.

Fixed on one end of the hollow shaft 29 is a slow speed effecting drum 30 having a shiftable clutch setting collar 31 splined at 31s on transverse shaft 32 and being shiftable by a yoke lever 33 in a manner later set forth.

On the shaft 32 there is freely mounted a sprocket wheel 34 which is driven by a chain 34x from a sprocket pinion 35 which is powered by its shaft 36 from a short transverse shaft 37 which has a bevel gear set 38, Fig. 2, below the intermediate gear box 23; this gear set being driven by the sprocket chain 26 (from shaft 24). The sprocket wheel 34 is rigid with a clutch drum 39 having a clutch collar 40 which is splined at 40s on the shaft 32 and is operative for clutching and de-clutching by a yoke lever 41 to be described shortly.

Power is transmitted from the rear clutch shaft by way of sprocket pinions 42 fixed thereon down to respective rear traction wheels 4.

To secure simplicity of mechanism and easy operative control of the clutches of the shaft 32, a dual function clutch lever train is provided and here involves but a single, manual hand lever R, Figs. 2 and 4, and 8 and 9. The lower end of this lever R is universally journalled in a bearing 44 in the top of a housing 45 whose bottom is closed by a lever switch plate 46 having a switch channel with offset end portions 47—48 joined by a cross-pass 49; all of such dimensions as to shiftably receive the squared lower end of the lever R. When the lever end is in the cross-pass 49 the lever cannot be oscillated to right or left hand channel, but as the lever fully registers in either of the channels 47 or 48 it can be tilted according to the switch channel entered.

In the housing 45 is a fixed chair 50 whose end walls 51 have each an opening 52 and 53 which are positionally offset in a manner to respectively receive a pick-up link 54 or 55 which lie side to side, Fig. 10, in the housing chair and are adapted for reciprocation, each in its own opening 52 or 53. The inner ends of these links are positively stopped, in the innermost position of a link, by the interposed end wall of the chair 50, Fig. 10. When both of these links are in retracted position (illustrated) the squared, lower end of the hand lever R occupies a position in an opening formed by two, like and opposite recesses 54x and 55x made in the meeting faces of the pick-up links; the recesses being of such depth that the lower end of the lever R can be fully keyed in either recess and passed from channel 47 to 48, and vice versa. When the foot of the lever R is thus fully positioned in a channel then the lever engaged link 54 or 55 can be shifted outward on its supporting chair opening edge; leaving the other link idle or at rest.

Fig. 4 shows the pick-up link 55 pivotally connected at 56 to a reach bar 57 whose outer end pivotally connects with the lower end of a vertical arm 58 fixed to the adjacent end of a rock-shaft 59 journalled on the chassis. On this rock-shaft is fixed the right-hand yoke 41 for operation of clutch collar 40. Link 54 is pivotally connected at 60 to a reach bar 61 which is connected to a vertical arm 62 fixed to a rock-shaft 63 on which the yoke 33 is fixed for operation of clutch collar 31.

It will be seen from Fig. 10 that the rear clutch lever R cannot shift both links 54 and 55 at one time because each is end-stopped in its chair.

When the control lever R is in vertical or neutral position the clutch collars 31 and 40 are both free of their drums. By throwing the lever in one direction the collar 31 will engage its drum and the axle 32 will be driven by the low speed gear 28. A reverse push of the lever will connect the collar 40 to the fast speed drum. A great advantage of the very low speed drive is that the rod rotating shaft 6 can be driven at high speed, while the vehicle is moving forward or rearward at very low or other desired speed.

What is claimed is:

1. A sewer rod working tractor including a traction wheel axle, a driven manually controlled, variable forward and reverse speed transmission including a take-off shaft, a worm gear train operatively connected to said shaft, a jack shaft having a first clutch connected to and driven by said train for slow drive of the jack shaft, a faster drive clutch on said jack shaft, drive means connecting the said faster clutch to said take-off shaft, and a manually controlled means for selectively engaging either of said clutches, said means including a single lever, a pair of link assemblies, one for each clutch, and operatively connecting said lever with the respective clutch to effect axle drive by either clutch, and means by which the jack shaft and the axle are operatively connected.

2. A sewer rod working tractor having an axle with fixed traction wheels and a jack shaft, first means drivingly connecting said jack shaft with the axle, a worm gear wheel rotatable on said jack shaft, a second gear rotatable on the jack shaft, a driven variable speed transmission, a worm driving said worm wheel, a second means operatively connecting said worm to said transmission, a separate drive device for said second gear, third means operatively connecting said drive device to said transmission, fourth means operatively connecting said drive device to said second gear, a plurality of clutches on said jack shaft, one of said clutches being associated with said worm gear for slow speed drive of said jack shaft and the other of said clutches being associated with said second gear for high speed drive of the jack shaft, and a manually operative selector assembly including link elements for each clutch for selectively and operatively connecting a corresponding clutch of said jack shaft to its respective gear for selective speed drive of the axle.

WILLIAM D. OSBORN.

REFERENCES CITED

The following references are of record in the file of this patent:

UNITED STATES PATENTS

| Number | Name | Date |
| --- | --- | --- |
| 1,118,835 | Adams | Nov. 24, 1914 |
| 1,174,874 | Lawter | Mar. 7, 1916 |
| 1,188,009 | Morton | June 20, 1916 |
| 1,240,761 | Murnane | Sept. 18, 1917 |
| 1,292,116 | Spaven | Jan. 21, 1919 |
| 1,370,937 | Wicks | Mar. 8, 1921 |
| 1,430,219 | Dominguez | Sept. 26, 1922 |
| 1,533,531 | White | Apr. 14, 1925 |
| 1,611,865 | Ahlm | Dec. 28, 1926 |
| 1,807,779 | Drew | June 2, 1931 |
| 1,826,407 | Tenney | Oct. 6, 1931 |
| 1,869,746 | Hoke | Aug. 2, 1932 |
| 1,938,855 | Moyer | Dec. 12, 1933 |
| 2,225,129 | Osborn | Dec. 17, 1940 |